(12) United States Patent
Nyholm et al.

(10) Patent No.: US 9,225,814 B2
(45) Date of Patent: Dec. 29, 2015

(54) CASE FOR A TABLET SHAPED DEVICE AND A METHOD FOR MAKING A CASE FOR A TABLET SHAPED DEVICE

(71) Applicant: STM Management Pty Ltd, Alexandria (AU)

(72) Inventors: Ethan Nyholm, North Bondi (AU); Adina Jacobs, North Bondi (AU); Christopher Daniel Townsend, Cleveland (AU); Anton Liang Lee See, Camp Hill (AU)

(73) Assignee: STM Management Pty Ltd, Alexandria (AU)

( * ) Notice: Subject to any disclaimer, the term of this patent is extended or adjusted under 35 U.S.C. 154(b) by 0 days.

(21) Appl. No.: 14/319,657

(22) Filed: Jun. 30, 2014

(65) Prior Publication Data

US 2015/0001105 A1    Jan. 1, 2015

(30) Foreign Application Priority Data

Jul. 1, 2013    (AU) ................. 2013100893

(51) Int. Cl.
*A45C 11/00*    (2006.01)
*H04M 1/11*    (2006.01)
*G06F 1/16*    (2006.01)
*A45C 13/10*    (2006.01)

(52) U.S. Cl.
CPC ................. *H04M 1/11* (2013.01); *A45C 11/00* (2013.01); *G06F 1/1628* (2013.01); *A45C 13/1069* (2013.01); *A45C 2011/003* (2013.01); *A45C 2200/15* (2013.01); *Y10T 29/49716* (2015.01); *Y10T 29/49826* (2015.01)

(58) Field of Classification Search
CPC .... A45C 11/00; A45C 2011/003; G06F 1/16; G06F 1/1628; G06F 1/1667; G06F 1/1669; H04M 1/11
USPC ........ 206/45.2–45.24, 320; 248/188.2, 188.6, 248/309.1
See application file for complete search history.

(56) References Cited

U.S. PATENT DOCUMENTS

| | | | |
|---|---|---|---|
| 7,318,521 B2 * | 1/2008 | Lau | 206/320 |
| 8,132,670 B1 * | 3/2012 | Chen | 206/320 |
| 8,264,310 B2 * | 9/2012 | Lauder et al. | 206/320 |
| 8,344,836 B2 | 1/2013 | Lauder et al. | |
| 8,474,609 B1 | 7/2013 | Hong et al. | |
| 8,607,976 B2 * | 12/2013 | Wu et al. | 206/320 |
| 8,672,126 B2 * | 3/2014 | Rohrbach et al. | 206/320 |
| 8,714,351 B2 * | 5/2014 | Toulotte | 206/320 |
| 8,724,300 B2 | 5/2014 | Smith et al. | |
| 8,746,446 B2 * | 6/2014 | Chiang | 206/320 |
| 8,807,333 B1 * | 8/2014 | Cooper et al. | 206/45.23 |
| 8,817,457 B1 * | 8/2014 | Colby et al. | 206/320 |
| 8,878,637 B2 * | 11/2014 | Sartee et al. | 206/320 |
| 8,928,437 B2 * | 1/2015 | Lauder et al. | 206/320 |
| 2004/0240164 A1 * | 12/2004 | Lee | 361/683 |

(Continued)

*Primary Examiner* — Bryon Gehman
(74) *Attorney, Agent, or Firm* — Christensen Fonder P.A.

(57) ABSTRACT

A case for a tablet shaped device, the case including a body having a first face and a second face having a tablet shaped device receiving area; and a flap having a distal portion magnetically attracted to the body, and configurable between a first configuration in which the flap covers the tablet shaped device receiving area and the distal portion is wrapped around an edge of the body and contacts the first face such that the flap is secured by the magnetic attraction of the distal portion to the body, and a second configuration in which the flap is folded to form a stand secured by the magnetic attraction of the distal portion to the body.

20 Claims, 4 Drawing Sheets

(56) References Cited

U.S. PATENT DOCUMENTS

| | | |
|---|---|---|
| 2006/0007645 A1 | 1/2006 | Chen et al. |
| 2012/0088557 A1 | 4/2012 | Liang |
| 2012/0268891 A1 * | 10/2012 | Cencioni .................. 361/679.55 |
| 2013/0048514 A1 | 2/2013 | Corcoran et al. |

* cited by examiner

CASE FOR A TABLET SHAPED DEVICE AND A METHOD FOR MAKING A CASE FOR A TABLET SHAPED DEVICE

RELATED APPLICATION

The present application claims priority to Australian Patent Application No. 2013100893, filed Jul. 1, 2013, the disclosure of which is hereby incorporated by reference herein in its entirety.

TECHNICAL FIELD

The disclosure herein generally relates to a case for a tablet shaped device and a method for making a case for a tablet shaped device.

BACKGROUND

Cases for tablet shaped devices, examples of which include the APPLE IPAD®, SAMSUNG GALAXY® TAB, smartphones like the APPLE IPHONE®, and some personal digital assistants, are commercially available.

The commercially available cases for tablet shaped devices may not meet some of the needs of consumers, and may be more difficult and/or costly to manufacture than is desirable.

SUMMARY

Disclosed herein is a case for a tablet shaped device. The case comprises a body comprising a first face and a second face having a tablet shaped device receiving area. The case comprises a flap comprising a distal portion magnetically attracted to the body, and configurable between a first configuration in which the flap covers the tablet shaped device receiving area and the distal portion is wrapped around an edge of the body and contacts the first face such that the flap is secured by the magnetic attraction of the distal portion to the body, and a second configuration in which the flap is folded to form a stand secured by the magnetic attraction of the distal portion to the body.

Embodiments of the case may, when the flap is in the first configuration, protect a front and a rear of the tablet shaped device when received by the receiving area. The case may, when the flap is in the second configuration, support the tablet shaped device when received at an elevated angle with respect to a surface.

Securement of the flap by the magnetic attraction may facilitate relatively easy and rapid reconfiguration between the first configuration and the second configuration.

In an embodiment, the distal portion comprises a distal portion magnet having a magnetic orientation in the first configuration that is reversed in the second configuration. The distal portion magnet may be attracted to a first body magnet in the first configuration and, in the second configuration, to a second body magnet having a magnetic orientation that is reversed with respect to the first body magnet.

In an embodiment, in the second configuration the flap is folded and located at the first face.

In an embodiment, a plurality of legs are located at the first face. The plurality of legs may comprise a plurality of ridges. The distal portion may be configured to be located between the plurality of legs when the flap is in the first configuration.

The body may warp or distort during or subsequent to manufacture. The plurality of legs may provide stability when the warped body is placed on a flat surface. The legs may significantly relax manufacturing tolerances—for example the flatness of the rear—which may assist in the control of manufacturing costs.

In an embodiment, the flap comprises a first rigid sheet that in the second configuration is a base of the stand. The flap may comprise a second rigid sheet that in the second configuration is a brace of the stand.

Also disclosed herein is a method for making a case for a tablet shaped device. The method comprises the step of forming a body comprising at least a first material. The method comprises the step of forming a flap comprising at least a second material. The method comprises the step of fastening the flap to the body.

Forming the body independently of the flap may allow the flap and body to be formed of different materials and/or by different processes that respectively suit the flap and body.

Disclosed herein is a method for configuring a case for a tablet shaped device. The method comprises the step of reconfiguring a flap of the case between a first configuration and a second configuration. The flap comprises a distal portion magnetically attracted to a body of the case. In the first configuration, the flap covers a tablet shaped device receiving area of a second face of the body and the distal portion is wrapped around an edge of the body and contacts a first face of the body such that the flap is secured by the magnetic attraction of the distal portion to the body. In the second configuration the flap is folded to form a stand secured by the magnetic attraction of the distal portion to the body.

In an embodiment, the distal portion comprises a distal portion magnet having a magnetic orientation in the first configuration that is reversed in the second configuration. The distal portion magnet may be attracted to a first body magnet in the first configuration. In the second configuration, the distal portion magnet may be attracted to a second body magnet having a magnetic orientation that is reversed with respect to the first body magnet.

In an embodiment, in the second configuration the flap is folded and located at the first face. The flap may be located between a plurality of legs at the first face. Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DETAILED DESCRIPTION

Figure 1:
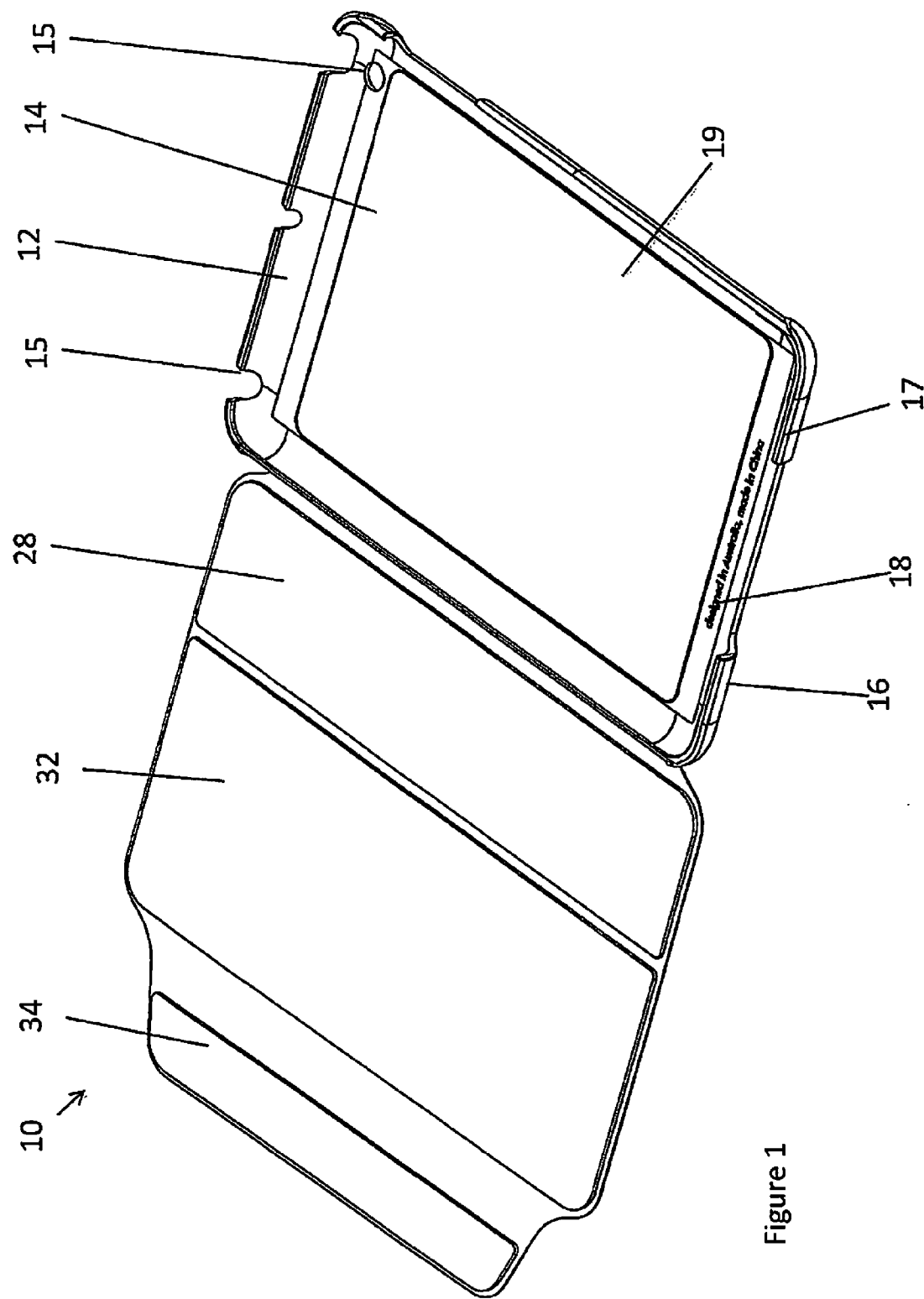
FIG. 1 shows a perspective view of an embodiment of a case for a tablet shaped device in a open and flat configuration.

FIG. 1 shows a perspective view of one embodiment of a case for a tablet shaped device, the case being generally indicated by the numeral 10. The case 10 has a body 12. The body 12 has a tablet shaped device receiving area 14 for receiving the tablet shaped device. In this but not necessarily all embodiment, the body 12 has a perimeter wall 16 and a rear wall 18 that protect the tablet shaped device when so received by the tablet shaped device receiving area 14. The perimeter wall 16 and the rear wall 18 have a plurality of optional ports 15 for cable or other access to the tablet shaped device when received.

The perimeter wall 16 has a resilient lip 17 located at a distal end thereof. The perimeter wall 16 and the tablet shaped device receiving area define a cavity in which the tablet shaped device is held by the resilient lip 17. The opening of the cavity is constricted by the resilient lip 17. The tablet shaped device may be inserted into the cavity by squeezing it through the opening defined by the resilient lip 17. The resilient lip 17 deforms to accommodate the passage of the tablet shaped device, and recoils back into shape subsequent to passage of the tablet shaped device. In another embodiment the tablet shaped device may be held to the tablet shaped device receiving area 14 by at least one elastic strap or generally by any suitable fastener.

The tablet shaped device receiving area 14 has an optional inner lining in the form of a inner felt lining 19. The inner lining 19 provides a relatively soft surface to reduce scratching of the tablet shaped device. Other embodiments may not have an inner lining 19 or may have another suitable lining material.

Figure 2:
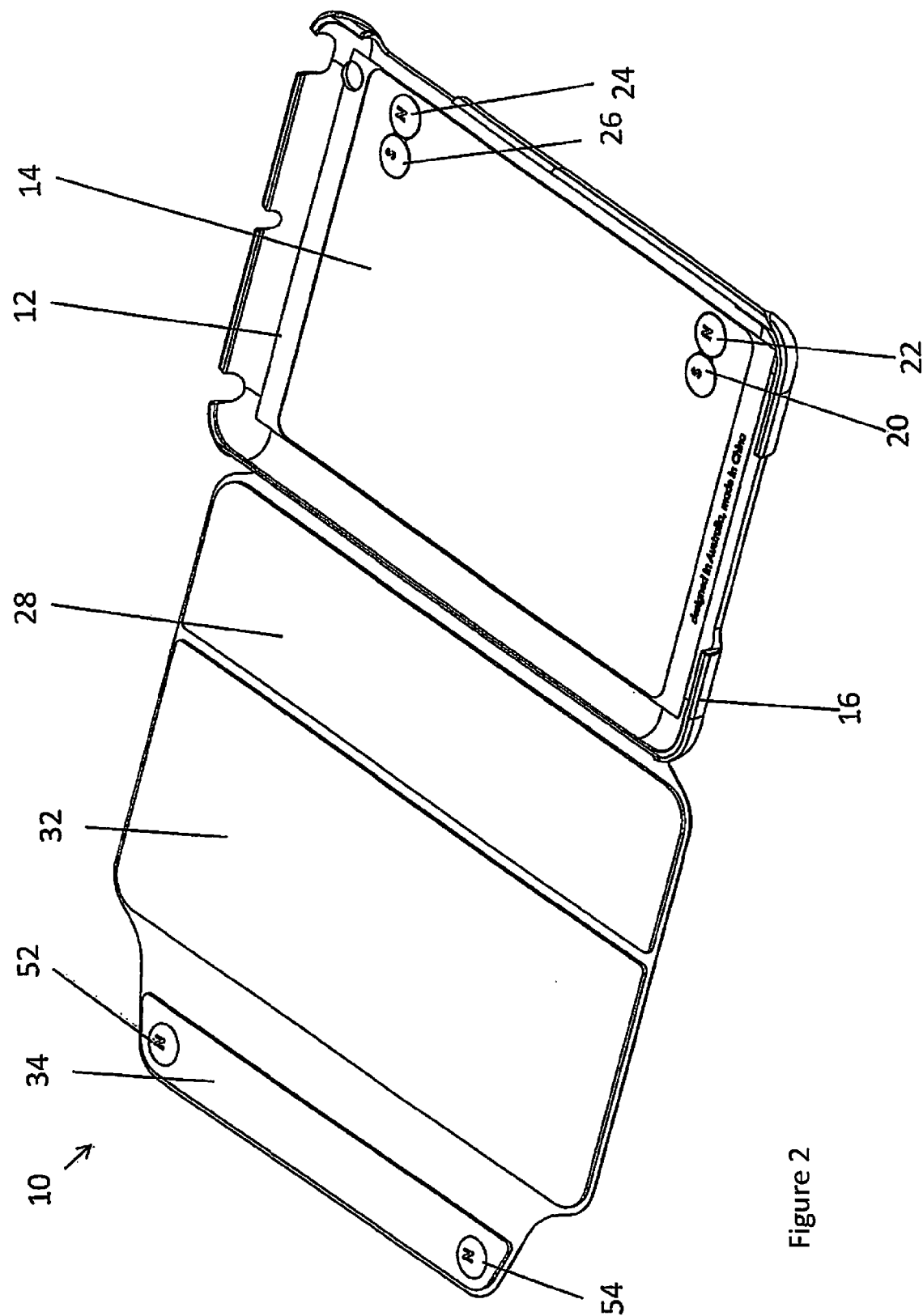
FIG. 2 shows the device of FIG. 1 with a lining removed to reveal a plurality of internal ferromagnetic elements.

FIG. 2 shows the case of FIG. 1 with the inner lining 19 removed to reveal a plurality of ferromagnetic elements in the form of a plurality of magnets 20, 22, 24, 26 at the body 12 (in this but not all embodiments in the body). The ferromagnetic elements may comprise rare earth magnets, iron magnets, a strip of plastic binder having a high coercivity ferromagnetic compound, or generally any suitable form of magnet or magnets. While in this embodiment there are 4 body magnets, other embodiments may have more or less body magnets, for example 1, 2, 3, 5, or more magnets.

The case 10 has a flap 28. A proximal end 30 (seen in FIG. 3) of the flap 28 is fixed to a rear of the body 12. In this embodiment, the proximal end 30 is fixed to the rear of the body 12 with an adhesive, however any suitable form of attachment may be used, for example thermal bonding, fasteners in the form of rivets, screws, clips, or other suitable fastener. The proximal end is in the form of a wing projecting from a flap body 32.

The flap 28 has a distal portion 34. In FIG. 2, the distal portion is shown transparently to illustrate internal ferromagnetic components 52, 54. In other embodiments, however, the ferromagnetic components 52, 54 of the flap may be located at a surface of the distal portion 34, and may have less or more than two ferromagnetic components. In the illustrated embodiment, the ferromagnetic components of the flap take the form of, for example, permanent magnets such as rare earth or iron magnets, or generally any suitable form of magnet. The ferromagnetic components 52, 54 of the flap are magnetically attracted to the ferromagnetic elements 20, 22, 24, 26 of the body.

In alternative embodiments, the ferromagnetic components 52, 54 are not magnets. They may comprise for example steel, which is attracted to the ferromagnetic elements 20-26. In other alternative embodiments, the ferromagnetic elements 20-26 are not magnets but the ferromagnetic components 52, 54 are. Generally any suitable arrangement of ferromagnetic materials may be used for the magnetic attraction between the distal end 34 of the flap 28 and the body 12.

Figure 3:
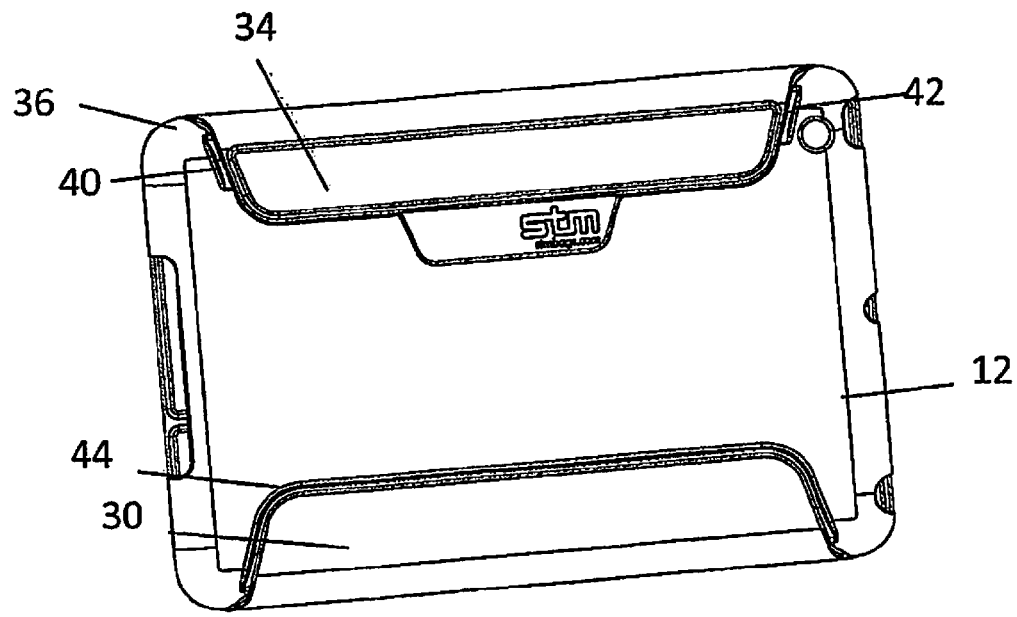
FIG. 3 shows a rear view of the device of FIG. 1 in a closed configuration.
Figure 4:
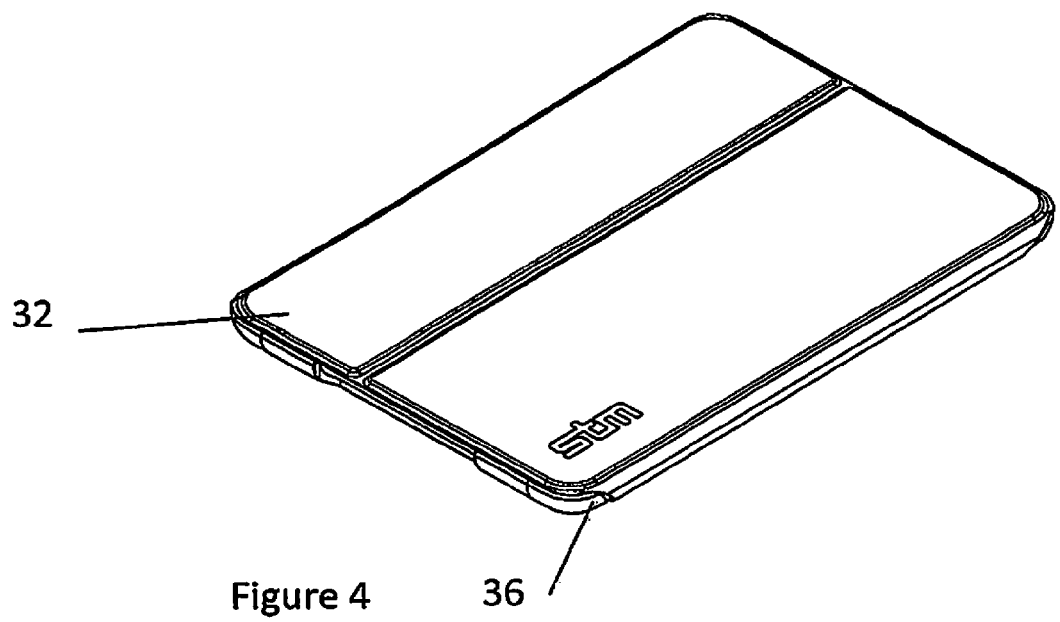
FIG. 4 shows a front view of the device of FIG. 1 in the closed consideration.

The flap 28 is configurable between a 1st configuration and a 2nd configuration. The 1st configuration is shown in FIGS. 3 and 4. In the 1st configuration the flap 28 covers the tablet shaped device receiving area 14. The distal portion 34 is wrapped around an edge 36 of the body 12 and the distal portion magnets 52, 54 are located at the body magnets 22, 24 to secure the flap 34 by magnetic attraction. In this configuration, a tablet shaped device received by the tablet shaped device receiving area 14 is protected by the body 12 and the flap 28.

Figure 5:
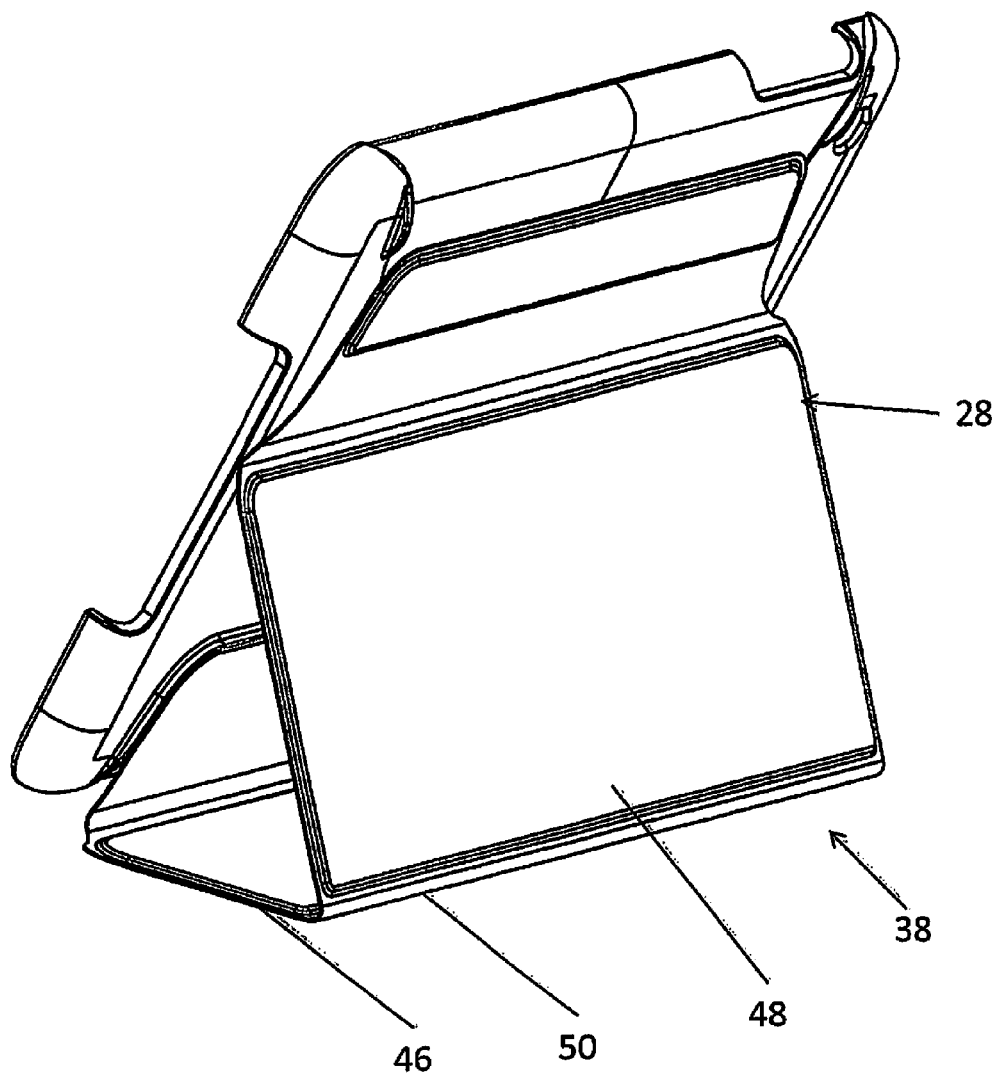
FIG. 5 shows a perspective view of the device of FIG. 1 in an open configuration wherein a flap is folded to form a stand.

In the 2nd configuration, the flap is folded to form a stand 38 as shown in FIG. 5. In the 2nd configuration, the distal portion magnets 52, 54 are located at the body magnets 20, 26 to secure the stand 38 by magnetic attraction. In this 2nd configuration, the flap is folded behind the rear of the body 12.

The distal portion 34 has opposing faces 60, 62. One of the opposing faces 60 is received by the rear of the body 12 in the first configuration and the other of the opposing faces 62 is received by the rear of the body 12 in the second configuration. Consequently, the distal portion magnets 52, 54 have a magnetic orientation in the first configuration that is reversed in the second configuration. The distal portion magnet 54 is located at and attracted to a first body magnet 22 in the first configuration and, in the second configuration, is located at and attracted to a second body magnet 20 having a magnetic orientation that is reversed with respect to the first body magnet. Similarly, the distal portion magnet 52 is attracted to a third body magnet 24 in the first configuration and, in the second configuration, to a fourth body magnet 26 having a magnetic orientation that is reversed with respect to the third body magnet 24.

The flap 28 also has a third configuration shown in FIG. 1, in which the case is flat and open.

The rear of the body 12 has a plurality of legs 40, 42 and leg 44 projecting therefrom. In this embodiment, the legs 40-44 take the form of a plurality of ridges, however the plurality of legs may take any suitable alternative form, for example round protrusions. The legs provide stability when the case 10 is resting on a flat surface with the legs on the flat surface. The surface may be, for example, a bench top table top, or any other suitable surface at which a user may place the case and use the tablet shaped device held therein. The distal portion 34 is in the form of another wing projecting from the flap body 32. The width of the wing is less than the separation of the legs 40 and 42 so that the distal portion 34 may be located between the legs 40 and 42 when located at the rear.

As best seen in FIG. 5, the flap 28 has a 1st rigid sheet 46 and a 2nd rigid sheet 48 separated by a hinge 50. In the 2nd configuration, the 1st rigid sheet 46 is a base of the stand 28 and the 2nd rigid sheet 48 is a brace of the stand 38. The rigid sheets 46, 48 form a rigid barrier to protect the screen of the tablet shaped device when the flap is in the 1st configuration.

The case 10 may be made using generally any suitable method. An embodiment of making a case for a tablet shaped device has the step of forming a body comprising at least a first material. The method also has the step of forming a flap comprising at least a second material. In another step of the method, the flap and the body are fastened together using an adhesive, however any suitable form of attachment may be used, for example thermal bonding, fasteners in the form of rivets, screws, clips or other suitable fastener.

The step of forming the body may comprise forming the body by an injection moulding process. At least one polymer—for example a polyurethane, polycarbonate or generally any suitable polymer—may be injected into a mould configured for production of the body. The illustrated embodiment has a body 12 formed by injection moulding. The body 12 has a polycarbonate exterior and a polyurethane interior. The polyurethane is relatively soft for receiving the tablet shaped device. The relatively resilient polyurethane facilitates insertion and removal of the device and providing a degree of shock resistance against knocks and falls. The polycarbonate exterior forms a hard protective shell.

The step of forming the flap comprises the step of forming a laminate of polymer board—an example of which includes but is not limited to polyethylene board—sandwiched between rigid polymer sheets in the form of polyethalane sheets, however any suitable polymer board and polymer sheet may be used. The board and the sheets may be heat bonded and may subsequently be trimmed.

Variations and/or modifications may be made to the embodiments described without departing from the spirit or ambit of the invention. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A case for a tablet shaped device, the case comprising:
a body comprising a first face, a plurality of legs at the first face, a second face having a tablet shaped device receiving area, and a ferromagnetic portion; and
a flap comprising a distal portion having a ferromagnetic portion, the ferromagnetic portion of the flap being magnetically attracted to the ferromagnetic portion of the body, and configurable between a first configuration in which the flap covers the tablet shaped device receiving area and the distal portion is wrapped around an edge of the body and contacts the first face between two of the plurality of legs such that the flap is secured by the magnetic attraction of the ferromagnetic portion of the distal portion to the ferromagnetic portion of the body, and a second configuration in which the flap is folded to form a stand secured by the magnetic attraction of the ferromagnetic portion of the distal portion to the ferromagnetic portion of the body.

2. The case of claim 1, wherein the ferromagnetic portion of the distal portion comprises a distal portion magnet having a magnetic orientation in the first configuration that is reversed in the second configuration, the ferromagnetic portion of the body portion comprises a first body magnet and a second body magnet, and the distal portion magnet is attracted to the first body magnet in the first configuration and, in the second configuration, to the second body magnet having a magnetic orientation that is reversed with respect to the first body magnet.

3. The case of claim 1, wherein in the second configuration the flap is folded and located at the first face.

4. The case of claim 1, wherein the flap comprises a first rigid sheet that in the second configuration is a base of the stand.

5. The case of claim 4, wherein the flap comprises a second rigid sheet that in the second configuration is a brace of the stand.

6. The case of claim 1 wherein the flap comprises a proximal portion disposed adjacent to at least one of the plurality of legs and fixed to the first face.

7. The case of claim 1, wherein the ferromagnetic portion of the distal portion comprises a magnet and the ferromagnetic portion of the body comprises a material attracted to the magnet.

8. The case of claim 7 wherein the ferromagnetic portion of the body comprises a magnet.

9. The case of claim 7 wherein the material magnetically attracted to the magnet comprises a magnet, iron or steel.

10. The case of claim 1, wherein the plurality of legs comprises a plurality of ridges.

11. The case of claim 10 wherein each of the plurality of ridges projects outwardly and away from the first face of the body, one of the plurality of ridges disposed adjacent a first corner of the body, and another of the plurality of ridges disposed adjacent a second corner of the body.

12. A method for making a case for a tablet shaped device, the method comprising the steps of:
forming a body of a case for a tablet shaped device of claim 1 comprising at least a first material;
forming a flap comprising at least a second material; and
fastening the flap of a case for a tablet shaped device of claim 1 to the body.

13. A method for configuring a case for a tablet shaped device, the method comprising the step of reconfiguring a flap of the case between a first configuration and a second configuration, wherein the flap comprises a distal portion having a ferromagnetic portion magnetically attracted to a ferromagnetic portion of a body of the case, and wherein in the first configuration the flap covers a tablet shaped device receiving area of a second face of the body and the distal portion is wrapped around an edge of the body and contacts a first face of the body such that the flap is secured by the magnetic attraction of the ferromagnetic portion of the distal portion to the ferromagnetic portion of the body, and in the second configuration the flap is folded to form a stand secured by the magnetic attraction of the ferromagnetic portion of the distal portion to the ferromagnetic portion of the body, and the flap is located at the first face and between a plurality of legs at the first face.

14. The method of claim 13, wherein the ferromagnetic portion of the distal portion comprises a distal portion magnet having a magnetic orientation in the first configuration that is reversed in the second configuration, the ferromagnetic portion of the body portion comprises a first body magnet and a second body magnet, and the distal portion magnet is attracted to the first body magnet in the first configuration and, in the second configuration, to the second body magnet having a magnetic orientation that is reversed with respect to the first body magnet.

15. A case for a tablet shaped device, the case comprising:
a body comprising a first face comprising a plurality of legs and a second face having a tablet shaped device receiving area, the body further comprising a securing portion; and
a flap comprising a distal portion having a securing portion that is magnetically attracted to the securing portion of the body, the flap being configurable between a first configuration in which the flap covers the tablet shaped device receiving area and the distal portion is wrapped around an edge of the body and contacts the first face between two of the plurality of legs such that the flap is secured by the magnetic attraction of the securing portion of the distal portion to the securing portion of the body, and a second configuration in which the flap is folded to form a stand secured by the magnetic attraction of the securing portion of the distal portion to the securing portion of the body.

16. The case of claim 15, wherein one of the plurality of legs is disposed adjacent a first corner of the body, and another of the plurality of legs is disposed adjacent a second corner of the body.

17. The case of claim 15, wherein the second face has a tablet shaped device receiving area includes a perimeter wall configured to hold the tablet shaped device.

18. The case of claim 15, wherein the flap comprises a first rigid sheet that in the second configuration is a base of the stand.

19. The case of claim 18, wherein the flap comprises a second rigid sheet that in the second configuration is a brace of the stand.

20. The case of claim 15 wherein the plurality of legs comprises a plurality of ridges.

* * * * *